Feb. 17, 1959     A. A. MARTIN     2,874,268

INSTRUMENT ILLUMINATING DEVICE

Filed Jan. 26, 1956

INVENTOR.
*Arlo A. Martin*
BY
*Walter J. Jason*
ATTORNEY.

United States Patent Office 2,874,268
Patented Feb. 17, 1959

2,874,268

INSTRUMENT ILLUMINATING DEVICE

Arlo A. Martin, La Mesa, Calif., assignor to General Dynamics Corporation, San Diego, Calif., a corporation of Delaware Application January 26, 1956, Serial No. 561,514

14 Claims. (Cl. 240—2.1)

This invention relates to improved illuminating means, and more particularly to means for illuminating indicating instruments mounted upon vehicular instrument panels.

Heretofore known lighting means for indicating instruments mounted upon vehicle instrument panels, particularly airplane instrument panels, have been complex, have not provided satisfactorily even illumination over the entire face of each instrument, or a lamp failure has seriously impaired illumination. One arrangement employed heretofore has employed a single cover panel fabricated to illuminate all the instruments on the panel. This arrangementment requires that great care be taken in making the panel to properly fit all the instruments properly. Such a panel lacks flexibility, requiring the design and fabrication of a new panel if an additional instrument or a different arrangement of instruments is desired. Further, such panels employ illuminating lamps positioned in such a manner that each lamp illuminates the corners of four instruments, each instrument having a lamp at each corner. Thus, if one lamp burns out, the illumination of four instruments is seriously reduced.

Another known instrument lighting arrangement provides an individual lighting arrangement for each instrument. Instrument illuminating lamps are installed at the top of each instrument face. A metal shield reflects the light in a downwardly direction onto the instrument face. As will be apparent, such an arrangement results in uneven illumination, the upper edge of the instrument dial being more brilliantly illuminated than the bottom. Therefore, to provide sufficient illumination at the bottom of the dial, the illumination at the top may be so bright as to glare, which is particularly undesirable in aircraft instrument panels. Furthermore, since room is available under the shield for only one or two lamps, a lamp failure seriously reduces illumination or entirely darkens the instrument dial.

The instrument illuminating means of this invention eliminates many of the disadvantages of the illuminating arrangements heretofore known to the art. A body of transparent, light-transmitting material having a light-controlling opaque coating on all surfaces except a light-transmitting surface adjacent to an opening exposing the instrument face is provided for each instrument. A hood overlying the light-transmitting surface shields the glowing surface from the eyes of the observer. A lamp may be mounted in each of four mutually opposite positions on the periphery of the body. The lamps are mounted in cooperating relationship with the light-transmitting body so that the face of the instrument is evenly illuminated, while the opaque coating on the light-transmitting body allows only instrument illuminating light to escape, thereby preventing glare by direct transmission to the eyes of the operator.

The illuminating body is affixed to the instrument, and the instrument is mounted to the instrument panel, both the illuminating body and instrument being held by a single set of mounting screws. A formed metallic insert in the light-transmitting material furnishes a novel lamp mounting means combined with means for mounting the illuminating body and the instrument to the panel. A spring-loaded cover retains the lamp in illuminating and circuit engaging position in the insert adjacent the mounting screw, whereby the lamp occupies only the space on the panel normally required for the mounting screw alone. Lamps may be easily replaced by the operator, even in flight. Moreover, when a lamp burns out, only one instrument is affected. Illumination is reduced in only one corner of the instrument affected, the illumination remaining being sufficient to enable the instrument to remain serviceable.

It is, therefore, an object of this invention to provide means for individually lighting each instrument on a panel.

Another object is to provide instrument lighting means which provides evenly distributed illumination over the instrument dial without glare.

Another object of this invention is to provide instrument lighting means providing proper light distribution having desirable brightness and uniformity.

Another object of this invention is to provide instrument lighting means wherein failure of an illuminating lamp affects only one instrument, and does not seriously reduce readability thereof.

Another object of this invention is to provide instrument lighting means of small size, which closely fits the face of the instrument, and permits close instrument spacing.

Another object of this invention is to provide instrument lighting means wherein lamps may be quickly and easily replaced from the front of the panel.

Another object of this invention is to provide instrument lighting means in which all parts except the lamps are integral, is mounted on the normally provided instrument mounting holes, and is held thereto by the normal instrument mounting screws.

Another object of this invention is to provide instrument lighting means which may easily be fabricated to fit any instrument, including those having control knobs.

Another object of this invention is to provide instrument lighting means which are light in weight, compact, rugged, provide even illumination without glare, are easy to maintain, and are simple and inexpensive to manufacture.

Other objects and advantages of this invention will be readily apparent from consideration of the following specification and annexed drawing, wherein.

Figure 1:
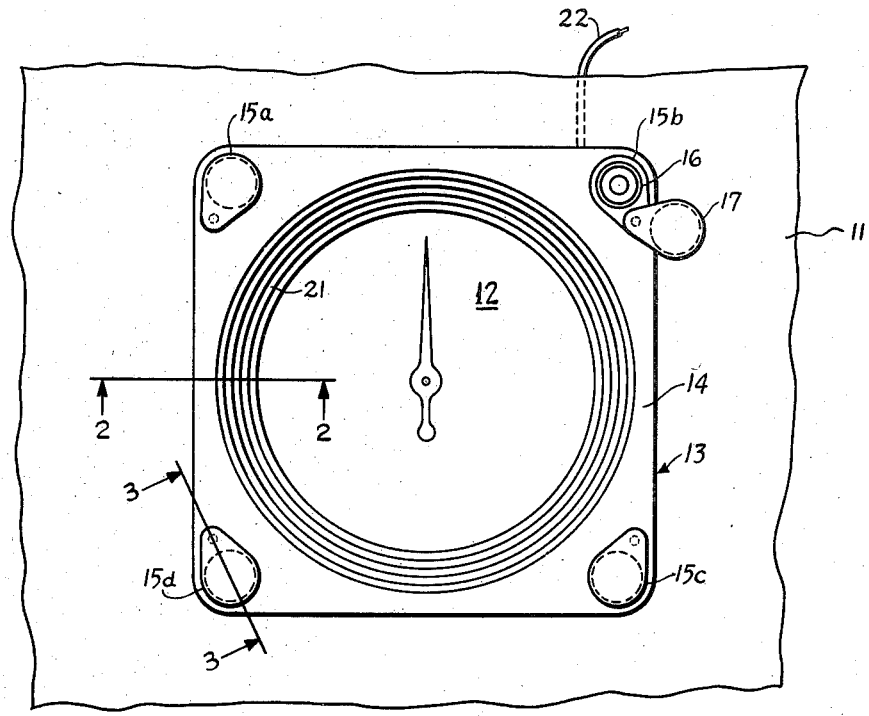
Figure 1 is a front view of the instrument illuminating device of this invention.

Referring now to the drawings, wherein like reference characters denote like or similar parts, there is shown in Figure 1 a portion of a grounded instrument panel 11, having an instrument 12 and illuminating device 13 mounted thereupon. Illuminating device 13 comprises a body portion 14 and a plurality of illuminating assemblies 15a, 15b, 15c and 15d, spaced about the periphery of the dial of instrument 12. Each illuminating assembly contains a lamp 16 and a movable cover 17. The interior surface of wall 18 emits light to the instrument dial, and integral hood 19 shields the glowing surface from the eyes of the observer. A vertically and horizontally stepped bevel 21 is formed into hood 19 adjacent the face of instrument 12, having an angle of approximately 30°, substantially equal to the angle conventionally present on the front of an instrument bezel, thereby allowing substantially all of the instrument dial to be visible. An insulated wire 22 furnishes electric power to the lamp 16 in each illuminating assembly 15.

Figure 2:
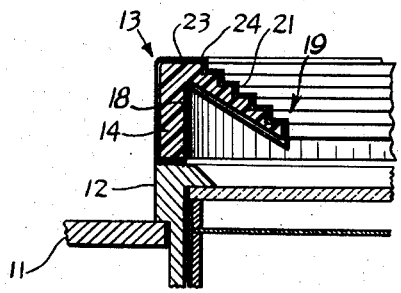
Figure 2 is a cross sectional view taken on the line 2—2 of Figure 1.
Figure 3:
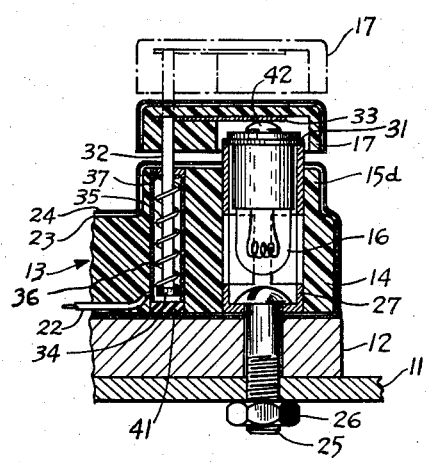
Figure 3 is a cross sectional view taken on the line 3—3 of Figure 1 showing a light emitting assembly including the lamp mounting and means for fastening the illuminating device and instrument to the panel.

The construction of illuminating device 13 is illustrated more clearly in Figures 2 and 3, which are cross sectional views taken at 2—2 and 3—3, respectively, in Figure 1. Body portion 14 of illuminating device 13 is mounted upon instrument 12, and both are affixed to instrument panel 11. Body portion 14 is formed in suitable manner, such as molding, from a transparent, light-transmitting material, preferably plastic, such as, for example, one of the acrylic resins or materials, and their polymers and copolymers, methyl-methacrylate being preferred, although other light-transmitting material such as quartz may be employed. The light-transmitting material may be dyed, preferably red, thereby transmitting only red light to the instrument dial. Alternatively, the light-transmitting material may be completely clear, and lamp 16 may have a tinted bulb or be furnished with a colored filter. The entire surface of body 14, except those areas which are adjacent to, and in illuminating cooperation, with the face of instrument 12, is coated with a layer 23 of a suitable light colored, preferably white, material such as paint to reflect all light rays, except those illuminating the instrument dial, back into the light-transmitting material, thereby preventing escape of direct light rays into the eyes of the instrument observer. To further prevent escape of stray light, and suppress any reflection from exposed surfaces, the instrument lighting device is further provided with an exterior coating 24 of a suitable dull, non-reflecting, preferably black material, such as paint, on top of the white layer 23.

As illustrated by Figure 2, the light-transmitting body portion 14 of illuminating device 13 comprises an upstanding wall 18 surrounding the dial of instrument 12, and an overlying hood or shield 19 overhanging from the inner periphery of the outer end of the upstanding wall. As is well-known to those skilled in the art, when the upstanding wall 18 is internally illuminated by lamp 16, the unpainted inner periphery thereof casts a glow across the face of instrument 12. The hood 19, overhanging the outer edge of upstanding wall 18, serves to shield the eyes of the observer from any direct light from glowing wall 18, permitting only indirect light reflected from the dial and pointer of instrument 12 to reach the eyes of the observer.

As illustrated by Figure 3, illuminating device 13 and instrument 12 are closely fastened to one another and to metal panel 11 by means of any suitable fasteners, exemplarily bolts 25, only one of which is illustrated in the cross section of the light emitting assembly illustrated in Figure 3. A mating locking nut 26 cooperates with each of bolts 25, urging the various parts together in cooperative relationship and securing the assembly against vibration. The light emitting assembly 15 includes a first tubular insert 27, fabricated of a suitable conductive metallic material such as brass, bronze, aluminum or alloys thereof, provided with an internal annular flange which acts as a bearing surface for the head of bolt 25, and additionally provides a mounting for lamp 16. Insert 27 may conveniently be of a generally cylindrical shape, having apertures cut into the wall thereof to enable light rays from lamp 16 to be transmitted into the light conducting material of the body 14 of illuminating device 13. Insert 17 may be assembled to body 14 in known manner. Exemplarily, insert 17 may be press fitted into a suitable hole in the transparent plastic material, may be molded therein, or cemented thereto.

Lamp 16 is slideably inserted into insert 27, the bulb being concentric therewith. A metallic shoulder 31 provided on lamp 16 is larger in diameter than insert 27, engaging the open end thereof. Lamp 16 is urged inwardly by spring-loaded cover 17, maintaining electrical contact between shoulder 31 and insert 27, and, through bolt 25, to grounded metallic instrument panel 11.

Cover 17 is conveniently formed of the same material as the body portion 14 of illuminating device 13 and coated as disclosed hereinabove. However, cover 17 may be formed of any suitable, easily worked electrical insulating material, since cover 17 does not conduct light. A metallic pin 32 is fixedly attached to cover 17. The upper end of pin 32 is welded, soldered, brazed or otherwise suitably fastened to metallic contact finger 33, cooperating with base contact 42 of lamp 16. A headed portion 34 is formed on the lower end of pin 32, preferably integrally therewith. Headed portion 34 is urged downwardly by a compressed coil spring 35. Pin 32 and spring 35 are enclosed in a metallic cylinder 36, inserted into and retained by the body portion 14 of illuminating device 13 in a manner similar to that disclosed hereinabove in connection with lamp insert 27. A shoulder 37 is provided at the top of cylinder 36 in order to retain spring 35 therein and provide a bearing surface for further compression of spring 35 as pin 32 is lifted with cover 17. Electrical wire 22 is conductively connected to cylinder 36. Cylinder 36 is shorter than the aperture in which it is fixed, allowing room at the bottom for disk 41, formed of an electrically insulating material. Disk 41 serves to prevent electrical contact between cylinder 36 and the metallic case of instrument 12.

As is customary, instrument panel 11 is electrically grounded to the vehicle frame. A suitable source of electricity (not shown) has one terminal similarly grounded to the vehicle frame. A suitable voltage is applied by said source of electricity to conductor 22 when it is desired to illuminate instrument 12. Electric current then flows through spring retaining cylinder 36, spring 35, pin 32, contact finger 33, base contact 42 of lamp 16, through the filament of lamp 16, conductive shoulder 31 of lamp 16, lamp insert 27, bolt 25, and to ground through instrument panel 11, the passage of electric current causing lamp 16 to glow. The illumination provided by lamp 16 escapes through the apertures provided in lamp insert 27 into the light conducting plastic body 14 of illuminating device 13. Body portion 14 conducts the light from each lamp in each direction, thereby providing a substantially equal light flux about the entire circumference of the dial of instrument 12. As more clearly illustrated by Figure 2, the light-transmitting body 14 casts a red glow horizontally through wall 18 toward the dial and pointer of instrument 12 about the entire periphery thereof, providing a soft and glareless even illumination of the instrument face. Hood 19 prevents escape of direct light from glowing wall 18 to the eyes of the observer.

If any of the lamps 16 should burn out, illumination will be reduced only in the quarter of the instrument dial adjacent thereto, the remaining illumination being sufficient to enable reading of the instrument. However, replacement of a burned-out lamp 16 may be readily accomplished by the operator of the vehicle. Cover 17 is pulled outwardly against the pressure of spring 35 a distance sufficient to clear the base of lamp 16, as illustrated in phantom in Figure 3. Upon clearance of the base of lamp 16, cover 17 is revolved and released, leaving lamp 16 exposed, as illustrated in connection with light assembly 15b in Figure 1. Lamp 16 may then be easily removed and replaced. Cover 17 is then pulled outwardly against the pressure of spring 35, rotated over lamp 16 and released, returning the affected light assembly 15 to operation.

Instrument illuminating device 13 may easily be fabricated to conform in size and shape to any instrument. Instruments employing setting knobs, such as altimeters, may be accommodated by forming illuminating device 13 with a cut out portion corresponding to the position of the knob and mounting light assembly 15 to one side of the cut out portion. If, as is usual, the setting knob is in a corner of the instrument case, the corresponding corner of illuminating device 13 is cut out, and light assembly 15 is offset to one side of the cut out portion, preferably in a position overlying the aperture provided in the instrument case for fastening to panel 11.

In order to allow illuminating device 13 to substantially conform in size and shape to the instrument upon which it is mounted, it is preferred to place light assembly 15 directly over the mounting hole provided in the instrument case. As illustrated in Figure 3, the head of instrument mounting bolt 25 is directly under lamp 16. Thus, the instrument 12 may be readily removed from panel 11 merely by removing lamp 16 in the manner disclosed hereinabove, and then removing bolt 25 through metallic insert 27 to free illuminating device 13 and instrument 12 from panel 11.

Thus, it will be seen that the illuminating device 13 takes up no more space on the panel than the instrument alone, allows the instrument to be easily removed for servicing, provides even, soft, glare-free illumination, and allows burnt-out lamps to be easily replaced.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. An illuminating device for an indicating instrument having a dial, said illuminating device comprising a body of light-transmitting material having an inner surface adjacent said instrument, an outer surface opposite said inner surface and a light emitting interior wall perpendicular to said inner surface, said interior wall delimiting an opening in said body for exposing said dial, said outer surface overhanging said interior wall and defining a hood, said hood being arranged to visibly mask said light emitting interior wall from points displaced from a line normal to the plane of said dial, a light source incased in said body of light-transmitting material, an opaque coating on said body covering said inner surface, said outer surface and said hood whereby only light from said interior wall escapes to illuminate said dial, and mounting means for fastening said body to said instrument.

2. An illuminating device for an indicating instrument having a dial, said illuminating device comprising a body of light-transmitting material having an inner surface adjacent said instrument, an outer surface opposite said inner surface, and a light emitting interior wall perpendicular to said inner surface, said interior wall delimiting an opening in said body for exposing said dial, said outer surface overhanging said interior wall and defining a hood, said hood being inclined inwardly toward said dial and arranged to visibly mask said light emitting interior wall from points displaced from a line normal to the plane of said dial, a light source incased in said body of light-transmitting material, an opaque coating on said body covering said inner surface, said outer surface and said hood whereby only light from said interior wall escapes to illuminate said dial, and mounting means for fastening said body to said instrument.

3. An illuminating device for an indicating instrument having a dial, said illuminating device comprising a body of light-transmitting material having an inner surface adjacent said instrument, an outer surface opposite said inner surface, and a light emitting interior wall perpendicular to said inner surface, said interior wall delimiting an opening in said body for exposing said dial, said outer surface overhanging said interior wall and defining a hood, said hood having an inner side inclined inwardly toward said dial and a beveled outer side, said hood being arranged to visibly mask said light emitting interior wall from points displaced from a line normal to the plane of said dial, a light source incased in said body of light-transmitting material, an opaque coating on said body covering said inner surface, said outer surface and said hood whereby only light from said interior wall escapes to illuminate said dial, and mounting means for fastening said body to said instrument.

4. An illuminating device for an indicating instrument having a dial, said illuminating device comprising a body of light-transmitting material having an inner surface adjacent said instrument and conforming to the shape thereof, an outer surface opposite said inner surface, and a light emitting interior wall perpendicular to said inner surface, said interior wall delimiting an opening in said body for exposing said dial, said outer surface overhanging said interior wall and defining a hood, said hood having an inner side inclined inwardly toward said dial for shielding said interior wall and being arranged to visibly mask said light emitting interior wall from points displaced from a line normal to the plane of said dial, and an outer side having a stepped bevel with a first plurality of light-absorbing surfaces parallel to said interior wall, said first plurality of surfaces connected by a second plurality of light-absorbing surfaces perpendicular to said interior wall, a light source incased in said body of light-transmitting material, an opaque coating of light-absorbing material on said body covering said inner surface, said outer surface and said hood thereby limiting escape of light from said illuminating device to said interior wall to illuminate said dial, and mounting means for fastening said body to said instrument.

5. An illuminating device for an indicating instrument having a dial and a plurality of apertures to enable fastening said instrument to an instrument panel, said illuminating device comprising a body of light-transmitting material having an inner surface adjacent said instrument and conforming to the shape thereof, an outer surface opposite said inner surface, and a light emitting interior wall perpendicular to said inner surface, said interior wall delimiting an opening in said body having the size and shape of said dial for exposing said dial, said outer surface overhanging said interior wall and defining a hood, said hood having an inner side inclined inwardly toward said dial arranged to visibly mask said light emitting interior wall from points displaced from a line normal to the plane of said dial and an outer side having a stepped bevel with a first plurality of light-absorbing surfaces parallel to said interior wall, said first plurality of surfaces connected by a second plurality of light-absorbing surfaces perpendicular to said interior wall, a plurality of light sources disposed in overlying relationship to said apertures and incased in said body of light-transmitting material, an opaque coating of light-absorbing material on said body covering said inner surface, said outer surface and said hood, thereby limiting escape of light from said illuminating device to said interior wall to illuminate said dial, and mounting means connected to said body and disposed in said apertures for fastening said body to said instrument and said instrument to said panel.

6. An illuminating device for an indicating instrument having a dial and a plurality of apertures disposed about the perimeter thereof to enable fastening said instrument to an instrument panel, said illuminating device comprising a body of light-transmitting material having an inner surface adjacent said instrument and conforming to the shape thereof, an outer surface opposite said inner surface, and a light emitting interior wall perpendicular to said inner surface, said interior wall delimiting an opening in said body having the size and shape of said dial for exposing said dial, said outer surface overhanging said interior wall and defining a hood, said hood having an inner side inclined inwardly toward said dial arranged to visibly mask said light emitting interior wall from points displaced from a line normal to the plane of said dial, and an outer side having a stepped bevel including a first plurality of light-absorbing surfaces parallel to said interior wall, said first plurality of surfaces connected by a second plurality of light-absorbing surfaces perpendicular to said interior wall, a plurality of light sources disposed in overlying relationship to said apertures and incased in said body of light-transmitting material, said light sources including a lamp and a lamp mounting having fastening means disposed in said apertures to secure said indicating instrument and said illuminating device to said instrument panel, an opaque coating of light-absorbing material on said body covering said inner surface, said outer surface and said hood, thereby limiting escape of light from said illuminating device to said interior wall to illuminate said dial.

7. In combination with an indicating instrument having a plurality of mounting means to enable fastening said instrument to an instrument panel, an instrument illuminating device comprising a body of light-transmitting material overlying said instrument and having an opening exposing the dial of said instrument, said opening having a light emitting interior wall perpendicular to said dial, said body of light transmitting materal including a hood arranged to visibly mask said light emitting interior wall from points displaced from a line normal to the plane of said dial; a plurality of light sources embedded in, and in illuminating relation with said body of light-transmitting material, said light sources including fastening means connected to said mounting means to secure said indicating instrument and said instrument illuminating device to said instrument panel.

8. In combination with an indicating instrument having a plurality of apertures to enable fastening said instrument to an instrument panel, an instrument illuminating device comprising a body of light-transmitting material overlying said instrument and having an opening exposing the dial of said instrument, a plurality of light sources disposed in overlying relationship to said apertures and incased in said body of light-transmitting material, said light sources including a lamp and a lamp mounting having fastening means connected to said lamp mounting and disposed in said apertures to secure said indicating instrument and said instrument illuminating device to said instrument panel.

9. In combination with an indicating instrument having a plurality of apertures disposed about the perimeter thereof to enable fastening said instrument to an instrument panel; an instrument illuminating device comprising a body of light-transmitting material overlying said instrument and having an opening exposing the dial of said instrument, a plurality of light sources disposed in overlying relationship to said plurality of apertures, said light sources being in illuminating relation with said body of light-transmitting material and including a lamp, a lamp mounting comprising a cylindrical member incased in said body of light-transmitting material and having an opening enabling said lamp to illuminate the interior of said body of light-transmitting material and having an internal flange, and headed fastening means underlying said lamp in abutting relation with said internal flange and disposed in said apertures whereby said indicating instrument and said illuminating device are secured to said instrument panel.

10. In combination with an indicating instrument having a plurality of apertures disposed about the perimeter thereof to enable fastening said instrument to an instrument panel; an instrument illuminating device comprising a body of light-transmitting material overlying said instrument and having an opening exposing the dial of said instrument, a plurality of light sources disposed in overlying relationship to said plurality of apertures, said light sources embedded in said body of light-transmitting material and including a lamp enclosed in a lamp mounting comprising a cylindrical member having an opening enabling said lamp to illuminate the interior of said body of light-transmitting material, said cylindrical member having an internal flange, a lamp-retaining cover yieldingly connected to said lamp mounting, and headed fastening means underlying said lamp in abutting relation with said internal flange and disposed in said apertures whereby said indicating instrument and said illuminating device are secured to said instrument panel.

11. In combination with an indicating instrument having a plurality of apertures disposed about the perimeter thereof to enable fastening said instrument to an instrument panel; an instrument illuminating device comprising a body of light-transmitting material overlying said instrument and having an opening exposing the dial of said instrument, a plurality of light sources disposed in overlying relationship to said plurality of apertures, said light sources embedded in said body of light-transmitting material and including a lamp enclosed in a lamp mounting comprising a cylindrical member having an opening enabling said lamp to illuminate the interior of said body of light-transmitting material, said cylindrical member having an internal flange, a lamp-retaining cover overlying said lamp mounting and connected to a yieldably fastened sliding member, and headed fastening means underlying said lamp in abutting relation with said internal flange and disposed in said apertures whereby said indicating instrument and said illuminating device are secured to said instrument panel.

12. In combination with an indicating instrument having a plurality of apertures disposed about the perimeter thereof to enable fastening said instrument to an instrument panel; an instrument illuminating device comprising a body of light-transmitting material overlying said instrument and having an opening exposing the face of said instrument, a plurality of light sources disposed in overlying relationship to said plurality of apertures, said light sources cooperating with said body of light-transmitting material and including a lamp enclosed in a lamp mounting comprising a first cylindrical member having an opening enabling said lamp to illuminate the interior of said body of light-transmitting material, said first cylindrical member having an internal flange, a second cylindrical member, a rotatable rod yieldably retained in said second cylindrical member, and a lamp-retaining cover fastened to said rotatable rod, and headed fastening means underlying said lamp in abutting relation with said internal flange and disposed in said apertures whereby said indicating instrument and said illuminating device are secured to said instrument panel.

13. An illuminating device for an indicating instrument having a dial and a plurality of apertures disposed about the perimeter thereof to enable fastening said instrument to an instrument panel, said illuminating device comprising a body of light-transmitting material having an inner surface adjacent said instrument and conforming to the shape thereof, an outer surface opposite said inner surface, and an interior wall, said interior wall delimiting an opening in said body having the size and shape of said dial for exposing said dial, said outer surface overhanging said interior wall and defining a hood, said hood having an inner side inclined inwardly toward said dial for shielding said interior wall and an outer side having a stepped bevel including a first plurality of light-absorbing surfaces parallel to said interior wall, said first plurality of surfaces connected by a second plurality of light-absorbing surfaces perpendicular to said interior wall, a plurality of light sources disposed in overlying relationship to said apertures and incased in said body of light-transmitting material, said light sources cooperating with said body of light-transmitting material and including a lamp enclosed in a lamp mounting comprising a cylindrical member having an opening enabling said lamp to illuminate the interior of said body of light-transmitting material, said cylindrical member having an internal flange, a lamp-retaining cover associated with said lamp mounting, and headed fastening means underlying said lamp in abutting relation with said internal flange and disposed in said apertures to secure said indicating instrument and said illuminating device to said instrument panel, an opaque coating of light-absorbing material on said body covering said inner surface, said outer surface and said hood, thereby limiting escape of light from said illuminating device to said interior wall to illuminate said dial.

14. An illuminating device for an indicating instrument having a dial and a plurality of apertures disposed about the perimeter thereof to enable fastening said instrument to an instrument panel, said illuminating device comprising a body of light-transmitting material having an inner surface adjacent said instrument and conforming to the shape thereof, an outer surface opposite said inner surface, and an interior wall, said interior wall delimiting an opening in said body having the size and shape of said dial for exposing said dial, said outer surface overhanging said interior wall and defining a hood, said hood having an inner side inclined inwardly toward said dial for shielding said interior wall and an outer side having a stepped bevel including a first plurality of light-absorbing surfaces parallel to said interior wall, said first plurality of surfaces connected by a second plurality of light-absorbing surfaces perpendicular to said interior wall, a plurality of light sources disposed in overlying relationship to said apertures and incased in said body of light-transmitting material, said light sources cooperating with said body of light-transmitting material and including a lamp, a lamp mounting comprising a first cylindrical member enclosing said lamp and having an opening enabling said lamp to illuminate the interior of said body of light-transmitting material, said first cylindrical member having an internal flange, a second cylindrical member adjacent said first cylindrical member, a rotatable rod yieldably retained in said second cylindrical member, and a lamp-retaining cover fastened to said rotatable rod, headed fastening means underlying said lamp in abutting relation with said internal flange and disposed in said apertures whereby said indicating instrument and said illuminating device are secured to said instrument panel, an opaque coating of light-absorbing material on said body covering said inner surface, said outer surface and said hood, thereby limiting escape of light from said illuminating device to said interior wall to illuminate said dial.

References Cited in the file of this patent

UNITED STATES PATENTS

| | | |
|---|---|---|
| 2,140,972 | Rylsky | Dec. 20, 1958 |
| 2,507,035 | Maynard | May 9, 1950 |
| 2,614,783 | Spear | Oct. 21, 1952 |
| 2,695,354 | Neugass | Nov. 23, 1954 |
| 2,723,342 | Neugass | Nov. 8, 1955 |